(12) United States Patent
Uenishi et al.

(10) Patent No.: US 12,110,354 B2
(45) Date of Patent: Oct. 8, 2024

(54) PRODUCTION METHOD FOR AROMATIC VINYL-DIENE COPOLYMER AND PRODUCTION METHOD FOR RUBBER COMPOSITION

(71) Applicant: The Yokohama Rubber Co., LTD., Tokyo (JP)

(72) Inventors: Kazuya Uenishi, Kanagawa (JP); Yu Shinke, Kanagawa (JP); Yoshihiro Kameda, Kanagawa (JP); Masaki Sato, Kanagawa (JP); Ayaki Kazariya, Kanagawa (JP); Hideaki Sawa, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 839 days.

(21) Appl. No.: 17/271,097

(22) PCT Filed: Aug. 22, 2019

(86) PCT No.: PCT/JP2019/032844
§ 371 (c)(1),
(2) Date: Feb. 24, 2021

(87) PCT Pub. No.: WO2020/040254
PCT Pub. Date: Feb. 27, 2020

(65) Prior Publication Data
US 2021/0246246 A1   Aug. 12, 2021

(30) Foreign Application Priority Data

Aug. 24, 2018 (JP) ................................ 2018-157042

(51) Int. Cl.
*C08F 236/10* (2006.01)
*C08C 19/44* (2006.01)
(Continued)

(52) U.S. Cl.
CPC ............ *C08F 236/10* (2013.01); *C08C 19/44* (2013.01); *C08F 4/48* (2013.01); *C08K 3/013* (2018.01); *B60C 1/0016* (2013.01); *B60C 1/0025* (2013.01)

(58) Field of Classification Search
CPC ....... B60C 1/0016; B60C 1/0025; C08F 4/48; C08F 236/10; C08K 3/013
See application file for complete search history.

(56) References Cited

U.S. PATENT DOCUMENTS 3,716,495 A    2/1973   Hsieh
5,086,136 A *  2/1992   Takashima .............. C08F 36/04
                                                  526/335
(Continued)

FOREIGN PATENT DOCUMENTS

CN    107949586 A    4/2018
CN    108699197 A    10/2018
(Continued)

*Primary Examiner* — Michael M Dollinger
*Assistant Examiner* — Christina H. W. Rosebach
(74) *Attorney, Agent, or Firm* — Thorpe North & Western

(57) ABSTRACT

An object of the present invention is to provide a method of producing a copolymer that produces an aromatic vinyl-diene copolymer having a low glass transition temperature, and a method of producing a rubber composition using the method. The subject method produces an aromatic vinyl-diene copolymer having a content of repeating units derived from an aromatic vinyl in an amount of 18 mass % or greater, and among repeating units derived from a diene, a proportion of a vinyl structure of 8 mol % or less, a proportion of a 1,4-trans structure of 60 mol % or less, and a proportion of a 1,4-cis structure from 40 to 95 mol %, the method including copolymerizing a monomer containing an aromatic vinyl and a diene using an initiator prepared with an organolithium compound, an alkylaluminum, a metal (Continued)

alcoholate, and at least one polar compound selected from the group consisting of water and an alcohol.

8 Claims, 1 Drawing Sheet

(51) Int. Cl.
*C08F 4/48* (2006.01)
*C08K 3/013* (2018.01)
*B60C 1/00* (2006.01)

(56) References Cited

U.S. PATENT DOCUMENTS

| | | |
|---|---|---|
| 6,103,842 A | 8/2000 | Halasa et al. |
| 6,350,834 B1 | 2/2002 | Schade et al. |
| 7,906,592 B2 | 3/2011 | Luo |
| 2006/0149010 A1 | 7/2006 | Halasa et al. |
| 2018/0282446 A1 * | 10/2018 | Uenishi ............... C08F 36/06 |
| 2019/0023880 A1 | 1/2019 | Uenishi et al. |

FOREIGN PATENT DOCUMENTS

| | | | |
|---|---|---|---|
| EP | 877034 A1 | 11/1998 | |
| EP | 1676634 A1 | 7/2006 | |
| EP | 3348588 A1 | 7/2018 | |
| EP | 3421511 A1 | 1/2019 | |
| JP | 2712622 B2 | 2/1998 | |
| JP | 10-306114 A | 11/1998 | |
| JP | 2006-188682 A | 7/2006 | |
| JP | 2017-149931 A | 8/2017 | |
| KR | 10-0549888 B1 | 4/2006 | |
| WO | WO-2017043553 A1 * | 3/2017 | ............ C08C 19/22 |
| WO | 2017/145799 A1 | 8/2017 | |

* cited by examiner

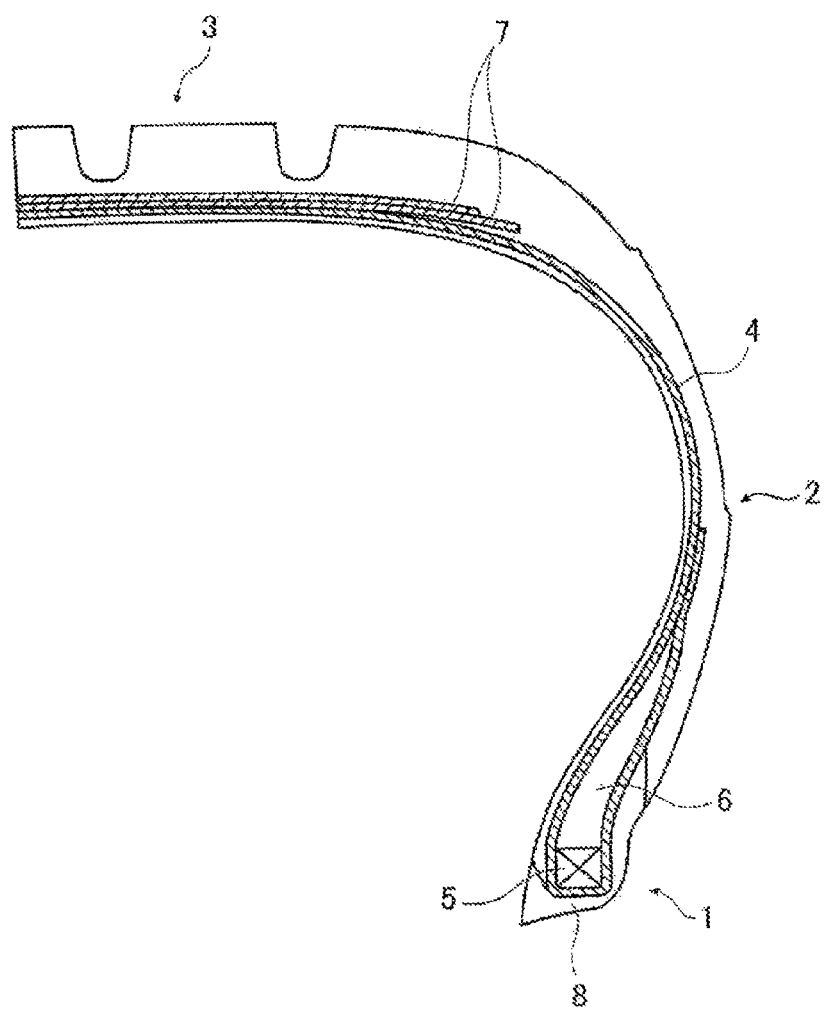

PRODUCTION METHOD FOR AROMATIC VINYL-DIENE COPOLYMER AND PRODUCTION METHOD FOR RUBBER COMPOSITION

TECHNICAL FIELD

The present invention relates to a method of producing an aromatic vinyl-diene copolymer and a method of producing a rubber composition.

BACKGROUND ART

Diene polymers such as a butadiene homopolymer (BR) and a styrene-butadiene copolymer (SBR) have been known as rubber materials used in tires, and the like.

Note that diene polymers are produced mainly by emulsion polymerization or solution polymerization. For example, Patent Document 1 describes a method of producing a diene (conjugated diene) polymer by solution polymerization, in which the method includes using a catalyst composition containing (a) a dialkoxy barium compound, (b) an organoaluminum compound, (c) an organolithium compound, and (d) an amine compound represented by General Formula (I) or a diamine compound represented by General Formula (II) and polymerizing a conjugated diene or a monomer formed from a conjugated diene and an aromatic vinyl compound in an inert organic solvent.

CITATION LIST

Patent Literature

Patent Document 1: JP 2712622 B

SUMMARY OF INVENTION

Technical Problem

In recent years, for example, for the reason of improving characteristics in a low temperature environment, a material having a low glass transition temperature (Tg) (e.g., −80° C. or lower) has been required for a copolymer of an aromatic vinyl and a diene (aromatic vinyl-diene copolymer) (e.g., SBR).

For example, a copolymer of an aromatic vinyl and a diene (e.g., SBR) produced by the method described in Patent Document 1 has a relatively high Tg, and a material having a lower Tg has been demanded.

In light of the circumstances described above, an object of the present invention is to provide a method of producing an aromatic vinyl-diene copolymer that produces an aromatic vinyl-diene copolymer having a low glass transition temperature, and a method of producing a rubber composition using the method.

Solution to Problem

As a result of diligent research on the problems described above, the inventors of the present invention found that the problems described above can be solved by using an initiator prepared with an organolithium compound, an alkylaluminum, a metal alcoholate, and at least one polar compound selected from the group consisting of water and an alcohol, and thus completed the present invention.

In other words, the present inventors have found that the above-described problems can be solved by the following configurations.

(1) A method of producing an aromatic vinyl-diene copolymer, the aromatic vinyl-diene copolymer being a copolymer of an aromatic vinyl and a diene, and the aromatic vinyl-diene copolymer having a content of repeating units derived from an aromatic vinyl in an amount of 18 mass % or greater, and among repeating units derived from a diene, a proportion of a vinyl structure of 8 mol % or less, a proportion of a 1,4-trans structure of 60 mol % or less, and a proportion of a 1,4-cis structure from 40 to 95 mol %, the method of producing the aromatic vinyl-diene copolymer including copolymerizing a monomer containing an aromatic vinyl and a diene using an initiator, the initiator being prepared with an organolithium compound, an alkylaluminum, a metal alcoholate, and at least one polar compound selected from the group consisting of water and an alcohol.

(2) A method of producing an aromatic vinyl-diene copolymer, the aromatic vinyl-diene copolymer being a copolymer of an aromatic vinyl and a diene, the aromatic vinyl-diene copolymer having a content of repeating units derived from an aromatic vinyl in an amount of 18 mass % or greater, among repeating units derived from a diene, a proportion of a vinyl structure of 8 mol % or less, a proportion of a 1,4-trans structure of 60 mol % or less, and a proportion of a 1,4-cis structure from 40 to 95 mol %, and the aromatic vinyl-diene copolymer having a terminal that is modified with at least one electrophile selected from the group consisting of titanium halide, tin halide, cyclic silazane, alkoxysilane, epoxide, amine, ketone, and a compound represented by Formula (N), which will be described later, the method of producing the aromatic vinyl-diene copolymer including copolymerizing a monomer containing an aromatic vinyl and a diene using an initiator, the initiator being prepared with an organolithium compound, an alkylaluminum, a metal alcoholate, and at least one polar compound selected from the group consisting of water and an alcohol, and then terminating the polymerization using the electrophile.

(3) The method of producing an aromatic vinyl-diene copolymer according to (1) or (2) above, wherein a proportion of an amount of the polar compound with respect to an amount of the organolithium compound in terms of molar ratio is from 1/15 to 1/1.

(4) A method of producing a rubber composition including:

producing an aromatic vinyl-diene copolymer by using the method of producing an aromatic vinyl-diene copolymer according to any one of (1) to (3) above, and mixing the aromatic vinyl-diene copolymer as obtained with a filler and obtaining a rubber composition.

Advantageous Effects of Invention

As described below, according to embodiments of the present invention, a method of producing an aromatic vinyl-diene copolymer that produces an aromatic vinyl-diene copolymer having a low glass transition temperature, and a method of producing a rubber composition using the method can be provided.

BRIEF DESCRIPTION OF DRAWINGS

FIG. 1 is a partial cross-sectional schematic view that represents a pneumatic tire according to an embodiment of the present invention.

DESCRIPTION OF EMBODIMENTS

The method of producing an aromatic vinyl-diene copolymer and the method of producing a rubber composition using the method of producing an aromatic vinyl-diene copolymer according to embodiments of the present invention will be described below.

In the present specification, a numerical range indicated using "(from) . . . to . . . " includes the former number as the lower limit value and the latter number as the upper limit value.

Method of Producing an Aromatic Vinyl-Diene Copolymer ("Method 1" According to an Embodiment of the Present Invention)

Method 1 according to an embodiment of the present invention is a method of producing an aromatic vinyl-diene copolymer, the aromatic vinyl-diene copolymer being a copolymer of an aromatic vinyl and a diene, and the aromatic vinyl-diene copolymer having a content of repeating units derived from an aromatic vinyl in an amount of 18 mass % or greater, and among repeating units derived from a diene, having a proportion of a vinyl structure of 8 mol % or less, a proportion of a 1,4-trans structure of 60 mol % or less, and a proportion of a 1,4-cis structure from 40 to 95 mol %, the method of producing the aromatic vinyl-diene copolymer including copolymerizing a monomer containing an aromatic vinyl and a diene using an initiator, the initiator being prepared with an organolithium compound, an alkylaluminum, a metal alcoholate, and at least one polar compound selected from the group consisting of water and an alcohol.

It is conceived that Method 1 according to an embodiment of the present invention can achieve desired effects because of using the initiator (specific initiator) prepared with an organolithium compound, an alkylaluminum, a metal alcoholate, and at least one polar compound selected from the group consisting of water and an alcohol. Although the reason is not clear, it is presumed as follows.

As described above, in Method 1 according to an embodiment of the present invention, monomers are copolymerized with the specific initiator. The organolithium compound, the alkylaluminum, and the metal alcoholate in the specific initiator stabilize the 1,4-structure (trans, cis) of the diene. Furthermore, a reaction product of the alkylaluminum and the polar compound in the specific initiator stabilizes, in particular, the 1,4-cis structure of the diene. As a result, the aromatic vinyl-diene copolymer obtained by Method 1 according to an embodiment of the present invention has a high proportion of 1,4-structure and, in particular, has a high proportion of 1,4-cis structure that is relatively less likely to be crystallized. It is conceived that, as a result, in a case where Method 1 according to an embodiment of the present invention is used, an aromatic vinyl-diene copolymer having a low glass transition temperature can be obtained.

Note that the major difference from the method described in Patent Document 1 is the use of at least one polar compound selected from the group consisting of water and an alcohol, and according to Method 1 according to an embodiment of the present invention, an aromatic vinyl-diene copolymer having a low glass transition temperature can be easily obtained.

Each of the components used in Method 1 according to an embodiment of the present invention will be described in detail below.

Specific Initiator

As described above, in Method 1 according to an embodiment of the present invention, a monomer is copolymerized by using an initiator (specific initiator) that is prepared with an organolithium compound, an alkylaluminum, a metal alcoholate, and at least one polar compound selected from the group consisting of water and an alcohol.

From the perspective of achieving even lower glass transition temperature and achieving excellent wear resistance, performance on ice, mechanical properties, WET performance, fuel economy performance, heat resistance, low temperature resistance, deterioration resistance, contamination resistance, light resistance, and steering stability when a rubber product (e.g., tire) is formed, the specific initiator is preferably an initiator using aromatic divinyl. That is, the specific initiator is preferably an initiator prepared with an organolithium compound, an alkylaluminum, a metal alcoholate, at least one polar compound selected from the group consisting of water and an alcohol, and aromatic divinyl.

Hereinafter, "achieving even lower glass transition temperature and achieving excellent wear resistance, performance on ice, mechanical properties, WET performance, fuel economy performance, heat resistance, low temperature resistance, deterioration resistance, contamination resistance, light resistance, and steering stability when a rubber product (e.g., tire) is formed" is referred to as "achieving superior effects of the present invention".

Organolithium Compound

Examples of the organolithium compound include monoorganolithium compounds, such as n-butyllithium (n-BuLi), see-butyllithium, tert-butyllithium, n-propyllithium, isopropyllithium, and benzyllithium; polyfunctional organolithium compounds, such as 1,4-dilithiobutane, 1,5-dilithiopentane, 1,6-dilithiohexane, 1,10-dilithiodecane, 1,1-dilithiodiphenylene, dilithiopolybutadiene, dilithiopolyisoprene, 1,4-dilithiobenzene, 1,2-dilithio-1,2-diphenylethane, 1,4-dilithio-2-ethylcyclohexane, 1,3,5-trilithiobenzene, and 1,3,5-trilithio-2,4,6-triethylbenzene. In particular, from the perspective of achieving superior effects of the present invention, monoorganolithium compounds such as n-butyllithium, see-butyllithium, and tert-butyllithium are preferred.

The amount of the organolithium compound used for preparation of the specific initiator is not particularly limited, and is preferably from 0.001 to 10 mol % with respect to the amount of monomers to be polymerized from the perspective of achieving superior effects of the present invention.

Alkylaluminum

The alkylaluminum is not particularly limited as long as it is a compound in which an alkyl group (open-chain, branched, cyclic) is bonded to an aluminum atom (Al). The number of carbons of the alkyl group is not particularly limited; however, from the perspective of achieving superior effects of the present invention, the number is preferably from 1 to 20, and more preferably from 5 to 10. Specific examples of the alkylaluminum include trimethylaluminum, triethylaluminum, triisopropylaluminum, tributylaluminum, triisobutylaluminum, tripropylaluminum, tributylaluminum, triisobutylaluminum, pentyldiethylaluminum, 2-methylpentyl-diethylaluminum, dicyclohexylethylaluminum, tripentylaluminum, trihexylaluminum, trioctylaluminum, tri(2-ethylhexyl)aluminum, tricyclohexylaluminum, tricyclopentylaluminum, tri(2,2,4-trimethylpentyl)aluminum, tridodecylaluminum, tri(2-methylpentyl)aluminum, diisobutylaluminum hydride, diethylaluminum hydride, dipropylaluminum hydride, propylaluminum dihydride, and isobutylaluminum dihydride. Among these, from the perspective of achieving superior effects of the present invention, trioctylaluminum is preferred.

The proportion of the alkylaluminum with respect to the organolithium compound used in the preparation of the specific initiator is not particularly limited; however, from the perspective of achieving superior effects of the present invention, the proportion is preferably from 0.1 to 50 molar equivalent, and more preferably from 0.5 to 10 molar equivalent. Note that 1 molar equivalent refers to an amount at the time when 1 mol of an alkylaluminum is added in a case where 1 mol of an organolithium compound is used. That is, the proportion of the alkylaluminum with respect to the organolithium compound used in the preparation of the specific initiator is not particularly limited; however, from the perspective of achieving superior effects of the present invention, the proportion is preferably from 10 to 5000 mol %, and more preferably from 50 to 1000 mol %.

Metal Alcoholate

The metal alcoholate (metal alkoxide) is not particularly limited as long as it is a compound obtained by substituting a hydrogen of the hydroxy group in the alcohol by a metal.

The metal is not particularly limited, and examples thereof include alkali metals, alkaline earth metals, transition metals (metals of Groups 3 to 11), aluminum, germanium, tin, and antimony. Among these, from the perspective of achieving superior effects of the present invention, an alkaline earth metal is preferred, and barium is more preferred.

The alcohol is not particularly limited as long as it is a compound in which a hydrogen atom of open-chain, branched, or cyclic hydrocarbon is substituted by a hydroxy group. The number of carbons of the alcohol is not particularly limited; however, from the perspective of achieving superior effects of the present invention, the number is preferably from 1 to 30, and more preferably from 1 to 20.

From the perspective of achieving superior effects of the present invention, the metal alcoholate is preferably barium alcoholate (barium alkoxide). Examples of the barium alkoxide include barium dimethoxide, barium diethoxide, barium dipropoxide, barium dibutoxide, and barium bis(2-ethylhexoxide).

The proportion of the metal alcoholate with respect to the organolithium compound used in the preparation of the specific initiator is not particularly limited; however, from the perspective of achieving superior effects of the present invention, the proportion is preferably from 0.01 to 5 molar equivalent, and more preferably from 0.1 to 3 molar equivalent. Note that 1 molar equivalent refers to an amount at the time when 1 mol of a metal alcoholate is added in a case where 1 mol of an organolithium compound is used. That is, the proportion of the metal alcoholate with respect to the organolithium compound used in the preparation of the specific initiator is not particularly limited; however, from the perspective of achieving superior effects of the present invention, the proportion is preferably from 1 to 500 mol %, and more preferably from 10 to 300 mol %.

Polar Compound

As described above, in Method 1 according to an embodiment of the present invention, at least one polar compound selected from the group consisting of water and an alcohol is used for the preparation of the specific initiator.

The alcohol is not particularly limited as long as it is a compound in which a hydrogen atom of open-chain, branched, or cyclic hydrocarbon is substituted by a hydroxy group. The number of carbons of the alcohol is not particularly limited; however, from the perspective of achieving superior effects of the present invention, the number is preferably from 1 to 30, and more preferably from 1 to 20.

From the perspective of achieving superior effects of the present invention, the polar compound is preferably water.

The proportion of the polar compound with respect to the organolithium compound used in the preparation of the specific initiator is not particularly limited; however, from the perspective of achieving superior effects of the present invention, the proportion in terms of molar ratio is preferably from $1/100$ to $1/1$, more preferably from $1/50$ to $1/2$, even more preferably from $1/20$ to $1/4$, and particularly preferably from $1/14$ to $1/6$.

Hereinafter "proportion (molar ratio) of the polar compound with respect to the organolithium compound used in the preparation of the specific initiator" is also referred to as "polar compound/Li".

Furthermore, the proportion of the polar compound with respect to the alkylaluminum used in the preparation of the specific initiator is not particularly limited; however, from the perspective of achieving superior effects of the present invention, the proportion in terms of molar ratio is preferably from $1/100$ to $1/0.1$, more preferably from $1/50$ to $1/0.2$, even more preferably from $1/20$ to $1/0.3$, and particularly preferably from $1/10$ to $1/0.5$. Hereinafter "proportion (molar ratio) of the polar compound with respect to the alkylaluminum used in the preparation of the specific initiator" is also referred to as "polar compound/Al".

Note that an amine compound may be used in place of the polar compound described above.

Herein, the amine compound is intended to mean a compound having an amino group ($-NH_2$, $-NHR$, $-NR_2$). Herein, R represents a substituent. Two R moieties of $-NR_2$ may be identical or different.

The substituent is not particularly limited as long as it is a monovalent substituent. Examples thereof include hydrocarbon groups that may each have a halogen atom, a hydroxy group, a nitro group, a carboxy group, an alkoxy group, an amino group, a mercapto group, an acyl group, an imide group, a phosphino group, a phosphinyl group, a silyl group, or a hetero atom.

Examples of the halogen atom include a fluorine atom, chlorine atom, bromine atom, and iodine atom.

Examples of the hetero atom of the hydrocarbon group that may have a hetero atom include an oxygen atom, nitrogen atom, sulfur atom, and phosphorous atom.

Examples of the hydrocarbon group that may have a hetero atom include aliphatic hydrocarbon groups, aromatic hydrocarbon groups, and groups that have a combination of these.

The aliphatic hydrocarbon group may be in a form of straight-chain, branched-chain, or ring. Specific examples of the aliphatic hydrocarbon group include straight-chain or branched alkyl groups (especially, those having from 1 to 30 carbons), straight-chain or branched alkenyl groups (especially, those having from 2 to 30 carbons), and straight-chain or branched alkynyl groups (especially, those having from 2 to 30 carbons).

Examples of the aromatic hydrocarbon group include aromatic hydrocarbon groups each having from 6 to 18 carbons, such as a phenyl group, a tolyl group, a xylyl group, and a naphthyl group.

Furthermore, in place of the alkylaluminum and the polar compound, an alkylaluminoxane maybe used.

Aromatic Divinyl

The aromatic divinyl is not particularly limited as long as it is an aromatic compound having two vinyl groups. Among these, from the perspective of achieving superior effects of the present invention, the aromatic divinyl is preferably divinylbenzene.

The proportion of the aromatic divinyl with respect to the organolithium compound used in the preparation of the specific initiator is not particularly limited; however, from the perspective of achieving superior effects of the present invention, the proportion is preferably from 0.1 to 5 molar equivalent, and more preferably from 0.3 to 3 molar equivalent. Note that 1 molar equivalent refers to an amount at the time when 1 mol of an aromatic divinyl is added in a case where 1 mol of an organolithium compound is used. That is, the proportion of the aromatic divinyl with respect to the organolithium compound used in the preparation of the specific initiator is not particularly limited; however, from the perspective of achieving superior effects of the present invention, the proportion is preferably from 10 to 500 mol %, and more preferably from 30 to 300 mol %.

Method of Preparing Specific Initiator

The method of preparing the specific initiator is not particularly limited, and examples thereof include a method in which the organolithium compound, the alkylaluminum, the metal alcoholate, and the polar compound described above is dissolved in a solvent. Among these, from the perspective of achieving superior effects of the present invention, the polar compound is preferably added after the organolithium compound, the alkylaluminum, and the metal alcoholate are mixed.

The type of the solvent is not particularly limited and, for example, an organic solvent can be used; however, from the perspective of achieving superior effects of the present invention, a solvent other than alcohol is preferred.

Monomer

The monomers used in Method 1 according to an embodiment of the present invention includes an aromatic vinyl and a diene. Note that the monomer used in Method 1 according to an embodiment of the present invention may further include another monomer in addition to the aromatic vinyl and the diene.

Aromatic Vinyl

The aromatic vinyl is not particularly limited, and examples thereof include styrene, α-methylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, 5-t-butyl-2-methylstyrene, vinylnaphthalene, dimethylaminomethylstyrene, and dimethylaminoethylstyrene. Among these, from the perspective of achieving superior effects of the present invention, styrene, α-methylstyrene, and 4-methylstyrene are preferred, and styrene is more preferred. Such aromatic vinyl may be used alone, or a combination of two or more types may be used.

Diene

The diene is not particularly limited, and examples thereof include butadiene (e.g., 1,3-butadiene), isoprene, and chloroprene. Among these, from the perspective of achieving superior effects of the present invention, 1,3-butadiene and isoprene are preferred. Such diene may be used alone, or a combination of two or more types may be used.

Other Monomer

As described above, the monomer used in Method 1 according to an embodiment of the present invention may be a copolymer to which another monomer has been copolymerized in addition to the aromatic vinyl and the diene. Examples of such a monomer include α- and β-unsaturated nitriles such as acrylonitrile and methacrylonitrile: unsaturated carboxylic acids or acid anhydrides such as acrylic acid, methacrylic acid, and maleic anhydride; unsaturated carboxylic acid esters such as methylmethacrylate, ethylacrylate, and butylacrylate: and non-conjugated dienes such as 1,5-hexadiene, 1,6-heptadiene, 1,7-octadiene, dicyclopentadiene, and 5-ethylidene-2-norbornene.

Next, structure and the like of the aromatic vinyl-diene copolymer obtained by Method 1 according to an embodiment of the present invention (hereinafter, also referred to as "Copolymer 1 according to an embodiment of the present invention") will be described in detail below.

Copolymerization of Monomer

As described above, in Method 1 according to an embodiment of the present invention, a monomer including an aromatic vinyl and a diene is copolymerized using a specific initiator. The specific initiator and the monomer are as described above.

The copolymerization method of the monomer is not particularly limited, and examples thereof include a method in which the monomer described above is added to an organic solvent solution containing the specific initiator described above and agitating in a temperature range from 0 to 120° ° C. (preferably from 30 to 100° C.).

The method for terminating the polymerization is not particularly limited, and examples thereof include a method of adding alcohol (especially, methanol) to the polymerization solution. Furthermore, the polymerization may be terminated by using a specific electrophile like Method 2 according to an embodiment of the present invention described below.

Aromatic Vinyl Content

The content of the repeating units derived from an aromatic vinyl (hereinafter, also referred to as "aromatic vinyl content") in Copolymer 1 according to an embodiment of the present invention is 18 mass % or greater. Among these, from the perspective of achieving superior effects of the present invention, the content is preferably 20 mass % or greater, and more preferably 25 mass % or greater. The upper limit is not particularly limited; however, from the perspective of achieving superior effects of the present invention, the upper limit is preferably 90 mass % or less, more preferably 70 mass % or less, and even more preferably 60 mass % or less.

Diene Content

The content of the repeating units derived from a diene (hereinafter, also referred to as "diene content") in Copolymer 1 according to an embodiment of the present invention is preferably 82 mass % or less, more preferably 80 mass % or less, and even more preferably 75 mass % or less, from the perspective of achieving superior effects of the present invention. From the perspective of achieving superior effects of the present invention, the lower limit is preferably 10 mass % or greater, more preferably 30 mass % or greater, and even more preferably 40 mass % or greater.

Microstructure

The microstructure of Copolymer 1 according to an embodiment of the present invention will be described below.

Vinyl Structure

In Copolymer 1 according to an embodiment of the present invention, among the repeating units derived from a diene, the proportion of the vinyl structure is 8 mol % or less. Among these, from the perspective of achieving superior effects of the present invention, the proportion is preferably 7 mol % or less, more preferably 6 mol % or less, even more preferably 5 mol % or less, and particularly preferably 4 mol % or less. The lower limit is not particularly limited and may be 0 mol %.

Note that the proportion of the vinyl structure refers to a proportion (mol %) of repeating units having a vinyl structure (e.g., 1,2-vinyl structure in a case where the diene is 1,3-butadiene) among all repeating units derived from diene.

1,4-Trans Structure

In Copolymer 1 according to an embodiment of the present invention, among the repeating units derived from a diene, the proportion of the 1,4-trans structure is 60 mol % or less. Among these, from the perspective of achieving superior effects of the present invention, the proportion is preferably 50 mol % or less, and more preferably 40 mol % or less. The lower limit is not particularly limited; however, from the perspective of achieving superior effects of the present invention, the lower limit is preferably 1 mol % or greater, more preferably 5 mol % or greater, and even more preferably 10 mol % or greater.

Note that the proportion of the 1,4-trans structure refers to a proportion (mol %) of repeating units having a 1,4-trans structure among all repeating units derived from diene.

1,4-Cis Structure

In the copolymer according to an embodiment of the present invention, among the repeating units derived from diene, the proportion of the 1,4-cis structure is from 40 to 95 mol %. Among these, from the perspective of achieving superior effects of the present invention, the proportion is preferably 50 mol % or greater, more preferably 60 mol % or greater, even more preferably 65 mol % or greater, yet even more preferably 70 mol % or greater, particularly preferably 75 mol % or greater, and most preferably 80 mol % or greater. From the perspective of achieving superior effects of the present invention, the upper limit of the proportion of the 1,4-cis structure is preferably 90 mol % or less.

Note that the proportion of the 1,4-cis structure refers to a proportion (mol %) of repeating units having a 1,4-cis structure among all repeating units derived from diene.

Note that, hereinafter, among repeating units derived from diene, "proportion of vinyl structure (mol %), proportion of 1,4-trans structure (mol %), proportion of 1,4-cis structure (mol %)" is also referred to as "vinyl/trans/cis".

Glass Transition Temperature

From the perspective of achieving superior effects of the present invention, the glass transition temperature (Tg) of Copolymer 1 according to an embodiment of the present invention is preferably −80° C. or lower. Among these, from the perspective of achieving superior effects of the present invention, the glass transition temperature (Tg) is preferably −85° C. or lower, and more preferably −90° C. or lower. The lower limit is not particularly limited; however, from the perspective of achieving superior effects of the present invention, the lower limit is preferably −100° C. or higher.

Note that, in the present specification, the glass transition temperature (Tg) is measured by using a differential scanning calorimeter (DSC) at a temperature elevation speed of 20° C./min and calculated based on the midpoint method.

Molecular Weight

The molecular weight of Copolymer 1 according to an embodiment of the present invention is not particularly limited; however, from the perspective of achieving superior effects of the present invention, the weight average molecular weight (Mw) is preferably from 1000 to 10000000, more preferably from 2000 to 5000000, and even more preferably from 3000 to 2000000. Furthermore, from the perspective of achieving superior effects of the present invention, the number average molecular weight (Mn) is preferably from 500 to 5000000, more preferably from 1000 to 2500000, and even more preferably from 1500 to 1000000.

Note that, in the present specification, the number average molecular weight (Mn) and the weight average molecular weight (Mw) are each a value obtained by gel permeation chromatography (GPC) measurement calibrated with polystyrene standards under the following conditions.

Solvent: Tetrahydrofuran

Detector: RI detector

Method of Producing an Aromatic Vinyl-Diene Copolymer ("Method 2" According to an Embodiment of the Present Invention)

Method 2 according to an embodiment of the present invention is a method of producing an aromatic vinyl-diene copolymer, the aromatic vinyl-diene copolymer being a copolymer of an aromatic vinyl and a diene, the aromatic vinyl-diene copolymer having a content of repeating units derived from an aromatic vinyl in an amount of 18 mass % or greater, among repeating units derived from a diene, having a proportion of a vinyl structure of 8 mol % or less, a proportion of a 1,4-trans structure of 60 mol % or less, and a proportion of a 1,4-cis structure from 40 to 95 mol %, and the aromatic vinyl-diene copolymer having a terminal that is modified with at least one electrophile selected from the group consisting of titanium halide, tin halide, cyclic silazane, alkoxysilane, epoxide, amine, ketone, and a compound represented by Formula (N) below (hereinafter, also referred to as "specific electrophile"), the method of producing the aromatic vinyl-diene copolymer including copolymerizing a monomer containing an aromatic vinyl and a diene using an initiator, the initiator being prepared with an organolithium compound, an alkylaluminum, a metal alcoholate, and at least one polar compound selected from the group consisting of water and an alcohol, and then terminating the polymerization using the electrophile.

Method 2 according to an embodiment of the present invention is identical to Method 1 according to an embodiment of the present invention described above except for terminating the polymerization of the monomers using the specific electrophile.

The structure and the like (specifically, aromatic vinyl content, diene content, microstructure, glass transition temperature, and molecular weight) of the aromatic vinyl-diene copolymer obtained by Method 2 according to an embodiment of the present invention (hereinafter, also referred to as "Copolymer 2 according to an embodiment of the present invention") are identical to those of Copolymer 1 according to an embodiment of the present invention described above except that the terminal is modified with a specific electrophile.

Because Copolymer 2 according to an embodiment of the present invention has a terminal modified with the specific electrophile, the terminal interact with the filler, and Copolymer 2 achieves excellent wear resistance, performance on ice, mechanical properties, WET performance, fuel economy performance, heat resistance, low temperature resistance, deterioration resistance, contamination resistance, light resistance, and steering stability when a rubber product (e.g., tire) is formed.

Note that, in a case where the specific electrophile is a titanium halide, a tin halide, or a compound represented by Formula (N) described below, the terminal of Copolymer 2 according to an embodiment of the present invention is presumed to interact with carbon black. In a case where the specific electrophile is a cyclic silazane, an alkoxysilane, or an amine, the terminal of Copolymer 2 according to an embodiment of the present invention is presumed to interact with silica. In a case where the specific electrophile is an epoxide or a ketone, the terminal of Copolymer 2 according to an embodiment of the present invention is presumed to interact with silica or carbon black.

From the perspective of achieving superior effects of the present invention, the specific electrophile is preferably a cyclic silazane, an alkoxysilane, or a compound represented by Formula (N) described below, and a cyclic silazane is more preferred.

Specific Electrophile

Each of the specific electrophiles will be described below.

Titanium Halide

The titanium halide is not particularly limited, and examples thereof include $TiCl_3$, $TiBr_3$, $Ti(OC_2H_5)Cl_2$, $Ti(OC_4H_9)Cl_2$, $TiCl_4$, $Ti(OC_2H_5)Cl_3$, and $Ti(OC_4H_9)Cl_3$. Among these, from the perspective of achieving superior effects of the present invention, $TiCl_3$ (trichlorotitanium) and $TiCl_4$ (tetrachlorotitanium) are preferred, and tetrachlorotitanium is more preferred.

Tin Halide

The tin halide is not particularly limited, and examples thereof include tin fluoride, tin chloride, tin bromide, tin iodide, and tin astatide.

Cyclic Silazane

The cyclic silazane is not particularly limited as long as it is a silazane in a cyclic form.

Note that "silazane" is intended to mean a compound having a structure in which a silicon atom and a nitrogen atom are directly bonded (compound having a Si—N bond).

From the perspective of achieving superior effects of the present invention, the cyclic silazane is preferably a compound represented by Formula (S) below.

[Chem 1]

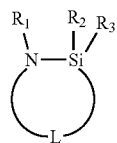

(S)

In Formula (S) above, $R_1$ to $R_3$ each independently represent a hydrogen atom or a substituent. Specific examples of the substituent are identical to those of R in Formula (P) described below.

From the perspective of achieving superior effects of the present invention, $R_1$ is preferably an alkyl group (preferably having from 1 to 10 carbons), an alkylsilyl group (preferably having from 1 to 10 carbons), or an aromatic hydrocarbon group (preferably having from 6 to 18 carbons).

From the perspective of achieving superior effects of the present invention, $R_2$ is preferably an alkoxy group (preferably having from 1 to 10 carbons).

In Formula (S) above, L represents a divalent organic group.

Examples of the divalent organic group include substituted or unsubstituted aliphatic hydrocarbon groups (e.g., an alkylene group, preferably having from 1 to 8 carbons), substituted or unsubstituted aromatic hydrocarbon groups (e.g., an arylene group, preferably having from 6 to 12 carbons), —O—, —S—, —SO$_2$—, —N(R)— (R: alkyl group), —CO—, —NH—, —COO—, —CONH—, and groups that have a combination of these (e.g., alkyleneoxy groups (—C$_m$H$_{2m}$O—: m is a positive integer), alkyleneoxycarbonyl groups, and alkylenecarbonyloxy groups).

From the perspective of achieving superior effects of the present invention, L is preferably an alkylene group (preferably having from 1 to 10 carbons).

Examples of the compound represented by Formula (S) above include N-n-butyl-1,1-dimethoxy-2-azasilacyclopentane, N-phenyl-1,1-dimethoxy-2-azasilacyclopentane, N-trimethylsilyl-1,1-dimethoxy-2-azasilacyclopentane, and N-trimethylsilyl-1,1-diethoxy-2-azasilacyclopentane.

Note that it is conceived that the silicon atom of the cyclic silazane exhibits electrophilicity.

Alkoxysilane

The alkoxysilane is not particularly limited as long as it is a compound having an alkoxysilyl group, and examples thereof include tetramethoxysilane, methyltrimethoxysilane, dimethyldimethoxysilane, tetraethoxysilane, methyltriethoxysilane, dimethyldiethoxysilane, phenyltrimethoxysilane, diphenyldimethoxysilane, phenyltriethoxysilane, diphenyldiethoxysilane, hexyltrimethoxysilane, hexyltriethoxysilane, 3-glycidoxypropyltrimethoxysilane, 3-glycidoxypropyltriethoxysilane, 3-glycidoxypropylmethyldimethoxysilane, N,N-bistrimethylsilyl-3-aminopropyltrimethoxysilane, and N,N-bistrimethylsilyl-3-aminopropyltriethoxysilane.

The number of the alkoxy groups in the alkoxysilyl group is not particularly limited; however, from the perspective of achieving superior effects of the present invention, the number is preferably 2 or more.

Note that it is conceived that the silicon atom of the alkoxysilane exhibits electrophilicity.

Epoxide

The epoxide is not particularly limited as long as it is a compound having an oxacyclopropane (oxirane) structure.

Specific examples of the epoxide include ethylene oxide, propylene oxide, butylene oxide, cyclohexene oxide, styrene oxide, 1-phenylpropylene oxide, methyl glycidyl ether, ethyl glycidyl ether, glycidyl isopropyl ether, butyl glycidyl ether, 1-methoxy-2-methylpropylene oxide, allyl glycidyl ether, 2-ethyloxyl glycidyl ether, phenyl glycidyl ether, p-tert-butylphenyl glycidyl ether, lauryl alcohol glycidyl ether, stearyl glycidyl ether, palmityl glycidyl ether, myristyl glycidyl ether, lauryl glycidyl ether, capryl glycidyl ether, and caproyl glycidyl ether.

Amine

The amine is not particularly limited as long as it is a compound having an amino group (—NR$_2$: R represents a hydrogen atom or a hydrocarbon group. The two R moieties may be identical or different). Among these, from the perspective of achieving superior effects of the present invention, the amine is preferably aziridine, Examples of the aziridine include N-methylaziridine, N-ethylaziridine, N-isopropylaziridine, N-phenylaziridine, N-(4-methylphenyl)aziridine, and N-methyl-2-methylaziridine.

Ketone

The ketone is not particularly limited as long as it is a compound having a ketone group (—CO—).

Specific examples of the ketone include acetone, benzophenone, and derivatives of these.

Examples of the derivatives of benzophenone include N,N,N',N'-tetramethyl-4,4'-diaminobenzophenone, N,N,N', N'-tetraethyl(4,4'-diamino)-benzophenone, N,N-dimethyl-1-aminobenzoquinone, N,N,N',N'-tetramethyl-1,3-diaminobenzoquinone, N,N-dimethyl-1-aminoanthraquinone, N,N,N',N'-tetramethyl-1,4-diaminoanthraquinone, 4,4'-diacetylbenzophenone.

Compound Represented by Formula (N)

A compound represented by Formula (N) below will be described below.

[Chem 2]

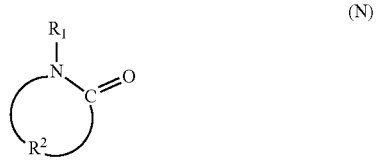

(N)

In Formula (N) above, $R^1$ represents a hydrogen atom or an alkyl group (preferably having from 1 to 10 carbons) and $R^2$ represents an alkylene group (preferably having from 2 to 10 carbons).

Specific examples of the compound represented by Formula (N) above include N-methylpyrrolidone (in Formula (N) above, $R_1$ is a methyl group and $R_2$ is a propylene group).

The amount of the specific electrophile with respect to the amount of the specific initiator is not particularly limited; however, from the perspective of achieving superior effects of the present invention, the ratio of the specific electrophile to the organolithium compound (specific electrophile/organolithium compound), in terms of molar ratio, is preferably from 0.1 to 10, and more preferably from 1 to 5.

From the perspective of achieving superior effects of the present invention, the ratio of the specific electrophile to the alkylaluminum (Alkyl Al) (specific electrophile/alkyl Al), in terms of molar ratio, is preferably from 0.1 to 10, and more preferably from 1 to 5.

From the perspective of achieving superior effects of the present invention, the ratio of the specific electrophile to the metal alcoholate (specific electrophile/metal alcoholate), in terms of molar ratio, is preferably from 0.1 to 20, and more preferably from 1 to 10.

Production Method for Rubber Composition

The method of producing a rubber composition according to an embodiment of the present invention is a method of producing a rubber composition including:

producing Copolymer 1 according to an embodiment of the present invention or the Copolymer 2 according to an embodiment of the present invention describe above (hereinafter, also collectively referred to as "copolymer according to an embodiment of the present invention") by using Method 1 according to an embodiment of the present invention or Method 2 according to an embodiment of the present invention described above (hereinafter, also collectively referred to as "method according to an embodiment of the present invention"), and mixing the copolymer as obtained according to an embodiment of the present invention with a filler, and obtaining a rubber composition.

Copolymer Production

The copolymer production (Method 1 according to an embodiment of the present invention or Method 2 according to an embodiment of the present invention) is as described above.

Mixing

The mixing is a step to obtain a rubber composition, in which the copolymer as obtained according to an embodiment of the present invention and a filler are mixed.

Filler

The filler used in the mixing is not particularly limited; however, from the perspective of achieving superior effects of the present invention, it is preferably carbon and/or silica.

In the mixing, another component other than the copolymer according to an embodiment of the present invention or the filler may be mixed.

Examples of such another component include various additives that are typically used in rubber compositions, such as silane coupling agents, zinc oxide (flower of zinc), stearic acid, adhesive resins, peptizing agents, anti-aging agents, waxes, processing aids, aroma oils, liquid polymers, terpene resins, thermosetting resins, vulcanizing agents (e.g., sulfur), and vulcanization accelerators.

Furthermore, the rubber composition may contain another rubber component other than the polymer according to an embodiment of the present invention. Examples of such another rubber component include natural rubber (NR), isoprene rubber (IR), butadiene rubber (BR), styrene-butadiene rubber (SBR) other than the polymer according to an embodiment of the present invention, acrylonitrile-butadiene copolymer rubber (NBR), butyl rubber (IIR), halogenated butyl rubber (Br—IIR, Cl—IIR), and chloroprene rubber (CR).

Application

The copolymer according to an embodiment of the present invention described above and the rubber composition obtained by the method of producing a rubber composition according to an embodiment of the present invention described above (hereinafter, also referred to as "composition according to an embodiment of the present invention") can be widely used for rubber products such as tires, conveyor belts, and hoses. In particular, using in tires is preferred.

Pneumatic Tire

The pneumatic tire according to an embodiment of the present invention is one that is produced using the composition according to an embodiment of the present invention described above. In particular, the pneumatic tire is preferably a pneumatic tire in which the composition according to an embodiment of the present invention is used (provided) in the tire tread (cap tread).

FIG. 1 is a partial cross-sectional schematic view of a pneumatic tire that represents a pneumatic tire according to an embodiment of the present invention, but the present invention is not limited to the embodiment illustrated in FIG. 1.

In FIG. 1, the reference sign 1 denotes a bead portion, the reference sign 2 denotes a sidewall portion, and the reference sign 3 denotes a tire tread portion.

In addition, a carcass layer 4, in which a fiber cord is embedded, is mounted between a left-right pair of bead portions 1, and ends of the carcass layer 4 are wound by being folded around bead cores 5 and a bead filler 6 from an inner side to an outer side of the tire.

In the tire tread portion 3, a belt layer 7 is provided along the entire circumference of the tire on the outer side of the carcass layer 4.

Additionally, a rim cushion 8 is provided in a portion of each of the bead portions 1 that is in contact with a rim.

Note that the tire tread portion 3 is formed from the composition according to an embodiment of the present invention described above.

The pneumatic tire according to an embodiment of the present invention can be produced, for example, in accordance with a known method. In addition, as a gas with which the pneumatic tire is filled, an inert gas such as nitrogen, argon, helium, or the like can be used in addition to a normal air or air whose oxygen partial pressure is adjusted.

EXAMPLE

An embodiment of the present invention will be described in further detail below by way of examples. However, an embodiment of the present invention is not limited to these examples.

Production of Aromatic Vinyl-Diene Copolymer

As described below, aromatic vinyl-diene copolymers were produced.

Comparative Example 1: SBR n-BuLi (available from Kanto Chemical Co., Inc.: 1.60 mol/L (hexane solution), 18 mL, 28.8 mmol), barium bis(2-ethylhexoxide) $(Ba(OCH_2CH(C_2H_5)CH_2CH_2CH_2CH_3)_2)$ (available from STREM: 1M (toluene/hexane solution) 7.5 mL), trioctyl aluminum (available from Aldrich: 25 wt. % (hexane solution), 45 mL), and cyclohexane (available from Kanto Chemical Co., Inc.: 10 mL) were mixed, and an initiator solution (did not correspond to the specific initiator described above) was prepared.

60 mL of the obtained initiator solution was added to a cyclohexane (4.23 kg) solution of a mixture of 1,3-butadiene (708 g, 13098 mmol) and styrene (380 g, 3649 mmol) and agitated at 60°C for 14 hours. After the mixture was cooled to room temperature, methanol (available from Kanto Chemical Co., Inc.: 3.44 g) was fed, and the polymerization was terminated. The obtained solution was taken out and concentrated under reduced pressure. The concentrated solution was poured into methanol (5 L) to separate a methanol-insoluble component. As a result, a styrene-butadiene copolymer (SBR) was obtained.

Example 1: SBR n-BuLi (available from Kanto Chemical Co., Inc.: 1.60 mol/L (hexane solution), 18 mL, 28.8 mmol), barium bis(2-ethylhexoxide) $(Ba(OCH_2CH(C_2H_5)CH_2CH_2CH_2CH_3)_2)$ (available from STREM: 1M (toluene/hexane solution) 7.5 mL), trioctyl aluminum (available from Aldrich: 25 wt. % (hexane solution), 45 mL), and cyclohexane (available from Kanto Chemical Co., Inc.: 10 mL) were mixed, then 0.035 mL of water (ratio (molar ratio) of added amount of water with respect to the amount of n-BuLi: 1/15) was added as the polar compound, and an initiator solution (corresponded to the specific initiator described above) was prepared.

60 mL of the obtained initiator solution was added to a cyclohexane (4.24 kg) solution of a mixture of 1,3-butadiene (708 g, 13098 mmol) and styrene (380 g, 3649 mmol) and agitated at 60°C for 14 hours. After the mixture was cooled to room temperature, methanol (available from Kanto Chemical Co., Inc.: 3.58 g) was fed, and the polymerization was terminated. The obtained solution was taken out and concentrated under reduced pressure. The concentrated solution was poured into methanol (5 L) to separate a methanol-insoluble component. As a result, a styrene-butadiene copolymer (SBR) was obtained.

Example 2: SBR

An SBR was obtained by a procedure identical to that of Example 1 except for changing the ratio (molar ratio) of added amount of water with respect to the amount of n-BuLi from 1/15 to 1/12.

Example 3: SBR

An SBR was obtained by a procedure identical to that of Example 1 except for changing the ratio (molar ratio) of added amount of water with respect to the amount of n-BuLi from 1/15 to 1/5.

Example 4: Titanium Halide Terminal Modified SBR

An SBR was obtained by a procedure identical to that of Example 2 except for terminating the polymerization by feeding tetrachlorotitanium (available from Aldrich: 14.7 g) in place of methanol. The obtained SBR was a styrene-butadiene copolymer in which the terminal was modified with a titanium halide (titanium halide terminal modified SBR).

Example 5: Tin Halide Terminal Modified SBR

An SBR was obtained by a procedure identical to that of Example 2 except for terminating the polymerization by feeding tin chloride ($SnCl_4$) (available from Kanto Chemical Co., Inc.: 18.9 g) in place of methanol. The obtained SBR was a styrene-butadiene copolymer in which the terminal was modified with a tin halide (tin halide terminal modified SBR).

Example 6: Cyclic Silazane Terminal Modified SBR

An SBR was obtained by a procedure identical to that of Example 2 except for terminating the polymerization by feeding a cyclohexane (10 mL) mixed solution of N-trimethylsilyl-1,1-dimethoxy-2-azasilacyclopentane (structure below) (17.0 g) and lithium diisopropylamide (available from Aldrich (2 M solution): 11 mL) in place of methanol. The obtained SBR was a styrene-butadiene copolymer in which the terminal was modified with a cyclic silazane (cyclic silazane terminal modified SBR).

[Chem 3]

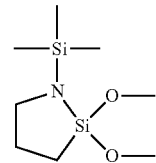

Example 7: Alkoxysilane Terminal Modified SBR

An SBR was obtained by a procedure identical to that of Example 2 except for terminating the polymerization by feeding a cyclohexane (10 mL) mixed solution of N,N-bistrimethylsilyl-3-aminopropyltrimethoxysilane (22.2 g) and lithium diisopropylamide (available from Aldrich (2 M solution): 11 mL) in place of methanol. The obtained SBR was a styrene-butadiene copolymer in which the terminal was modified with an alkoxysilane (alkoxysilane terminal modified SBR).

Example 8: N-methylpyrrolidone terminal modified SBR

An SBR was obtained by a procedure identical to that of Example 2 except for terminating the polymerization by feeding N-methylpyrrolidone (8.48 g) in place of methanol. The obtained SBR was a styrene-butadiene copolymer in which the terminal was modified with N-methylpyrrolidone (N-methylpyrrolidone terminal modified SBR).

For the obtained aromatic vinyl-diene copolymers, the aromatic vinyl content (content of repeating units derived from styrene), vinyl/trans/cis, Tg, and molecular weight are shown in Table 1 below.

TABLE 1

| Table 1 | Polar compound/Li | Electrophile | Aromatic vinyl content [mass %] | Microstructure [mol %] Vinyl structure | 1,4-Trans structure | 1,4-Cis structure | Tg [° C.] | Molecular weight Mn | Mw/Mn |
|---|---|---|---|---|---|---|---|---|---|
| Comparative Example 1 | | Methanol | 28 | 7 | 46 | 47 | −78 | 136000 | 1.8 |
| Example 1 | 1/15 | Methanol | 27 | 6 | 36 | 58 | −84 | 128000 | 1.6 |
| Example 2 | 1/12 | Methanol | 28 | 4 | 11 | 85 | −92 | 110400 | 1.7 |
| Example 3 | 1/5 | Methanol | 26 | 5 | 33 | 62 | −83 | 110000 | 1.8 |
| Example 4 | 1/12 | Titanium halide | 28 | 5 | 11 | 84 | −86 | 108000 | 1.7 |
| Example 5 | 1/12 | Tin halide | 29 | 6 | 11 | 83 | −87 | 120000 | 1.8 |
| Example 6 | 1/12 | Cyclic silazane | 28 | 6 | 8 | 86 | −90 | 115000 | 1.5 |
| Example 7 | 1/12 | Alkoxysilane | 26 | 4 | 12 | 84 | −88 | 102000 | 1.8 |
| Example 8 | 1/12 | NMP | 28 | 5 | 10 | 85 | −89 | 160000 | 1.6 |

As can be seen from Table 1, each of Examples 1 to 8 which used a specific initiator had a high proportion of 1,4-cis structure and a low glass transition temperature. Among these, each of Examples 2 to 8 in which polar compound/Li was 1/14 or greater had a higher proportion of 1,4-cis structure and a lower glass transition temperature. Among these, each of Examples 2 and 4 to 8 in which polar compound/Li was 1/6 or less had an even higher proportion of 1,4-cis structure and an even lower glass transition temperature.

REFERENCE SIGNS LIST

1 Bead portion
2 Sidewall portion
3 Tire tread portion
4 Carcass layer
5 Bead core
6 Bead filler
7 Belt layer
8 Rim cushion

The invention claimed is:

1. A method of producing an aromatic vinyl-diene copolymer, the aromatic vinyl-diene copolymer being a copolymer of an aromatic vinyl and a diene, and the aromatic vinyl-diene copolymer having a content of repeating units derived from an aromatic vinyl in an amount of 18 mass % or greater, and among repeating units derived from a diene, a proportion of a vinyl structure of 8 mol % or less, a proportion of a 1,4-trans structure of 60 mol % or less, and a proportion of a 1,4-cis structure from 40 to 95 mol %, the method of producing the aromatic vinyl-diene copolymer comprising copolymerizing a monomer containing an aromatic vinyl and a diene using an initiator, the initiator being prepared with an organolithium compound, an alkylaluminum, a metal alcoholate, and at least one polar compound comprising water.

2. A method of producing an aromatic vinyl-diene copolymer, the aromatic vinyl-diene copolymer being a copolymer of an aromatic vinyl and a diene, the aromatic vinyl-diene copolymer having a content of repeating units derived from an aromatic vinyl in an amount of 18 mass % or greater, among repeating units derived from a diene, a proportion of a vinyl structure of 8 mol % or less, a proportion of a 1,4-trans structure of 60 mol % or less, and a proportion of a 1,4-cis structure from 40 to 95 mol %, and the aromatic vinyl-diene copolymer having a terminal that is modified with at least one electrophile selected from the group consisting of titanium halide, tin halide, cyclic silazane, alkoxysilane, epoxide, amine, ketone, and a compound represented by Formula (N) below, the method of producing the aromatic vinyl-diene copolymer comprising:

copolymerizing a monomer containing an aromatic vinyl and a diene using an initiator, the initiator being prepared with an organolithium compound, an alkylaluminum, a metal alcoholate, and at least one polar compound comprising water; and then terminating the polymerization using the electrophile:

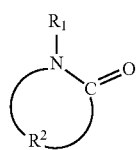

where in Formula (N), $R^1$ represents a hydrogen atom or an alkyl group, and $R^2$ represents an alkylene group.

3. The method of producing an aromatic vinyl-diene copolymer according to claim 1, wherein a proportion of an amount of the polar compound with respect to an amount of the organolithium compound in terms of molar ratio is from 1/15 to 1/1 .

4. A method of producing a rubber composition comprising:
producing an aromatic vinyl-diene copolymer by using the method of producing an aromatic vinyl-diene copolymer according to claim 1, and
mixing the aromatic vinyl-diene copolymer as obtained with a filler, and obtaining a rubber composition.

5. The method of producing an aromatic vinyl-diene copolymer according to claim 2, wherein a proportion of an amount of the polar compound with respect to an amount of the organolithium compound in terms of molar ratio is from 1/15 to 1/1 .

6. A method of producing a rubber composition comprising:
producing an aromatic vinyl-diene copolymer by using the method of producing an aromatic vinyl-diene copolymer according to claim 2, and
mixing the aromatic vinyl-diene copolymer as obtained with a filler, and obtaining a rubber composition.

7. A method of producing a rubber composition comprising:
producing an aromatic vinyl-diene copolymer by using the method of producing an aromatic vinyl-diene copolymer according to claim 3, and
mixing the aromatic vinyl-diene copolymer as obtained with a filler, and obtaining a rubber composition.

8. A method of producing a rubber composition comprising:
producing an aromatic vinyl-diene copolymer by using the method of producing an aromatic vinyl-diene copolymer according to claim 5, and
mixing the aromatic vinyl-diene copolymer as obtained with a filler, and obtaining a rubber composition.

\* \* \* \* \*